United States Patent [19]

Fratus

[11] Patent Number: 4,846,385
[45] Date of Patent: Jul. 11, 1989

[54] LOCKABLE MOUNTING BRACKET FOR CHAIN SAWS

[76] Inventor: William W. Fratus, 4331 Alta Campo Dr., Redding, Calif. 96002

[21] Appl. No.: 215,235

[22] Filed: Jul. 5, 1988

[51] Int. Cl.⁴ .................................................. B60R 7/00
[52] U.S. Cl. .............................. 224/42.45 R; 248/314; 248/552; 30/296 A
[58] Field of Search ....................... 224/42, 45 R, 315; 248/314, 317.1, 111, 552, 503, 37.6, 360; 211/4, 64, 70.7, 70.1, 60.1, 94; 76/25 A, 36, 37; 30/381, 382, 296 A, 166 A, 372, 166 R, 379.7

[56] References Cited

U.S. PATENT DOCUMENTS

| | | | |
|---|---|---|---|
| 1,593,722 | 7/1926 | Joyce | 248/314 |
| 2,291,381 | 7/1942 | Drake | 248/37.6 |
| 4,025,014 | 5/1977 | Larson | 248/552 |
| 4,159,773 | 7/1979 | Losenno | 248/117.1 |
| 4,473,176 | 9/1984 | Harper | 224/42.45 R |
| 4,722,113 | 2/1988 | Olsson | 248/111 |

Primary Examiner—Henry J. Recla
Assistant Examiner—Linda J. Sholl

[57] ABSTRACT

The invention provides a lockable bracket for chain saws especially suited for mounting outside to the tailgate of a pickup truck. A substantially rectangular panel having two narrow sides curvedly right angled forms a flattened U-shape housing. Longitudinally, the opened side of the U, the edges thereof, are sharply right angled outwardly into narrow mounting flanges attached to a rectangular base. The rectangular base has the same width and length as the two attached flanges and the top panel. The base acts as a second wall allowing protective insertion of a chain saw blade inside the flattened U structure between the panel and the base. The edges of the base where the flanges are attached serve as the mounting surface and has attachment apertures for mounting by bolts of screws. The bracket is designed for mounting on the outside of a pickup truck tailgate, but is sufficiently versatile to be mounted on any support surface including a wall for display purposes.

5 Claims, 1 Drawing Sheet

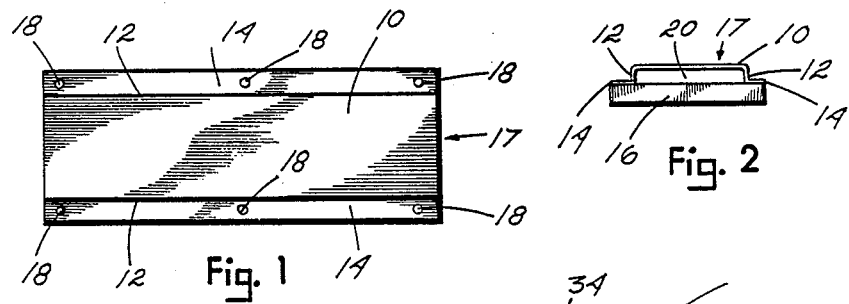
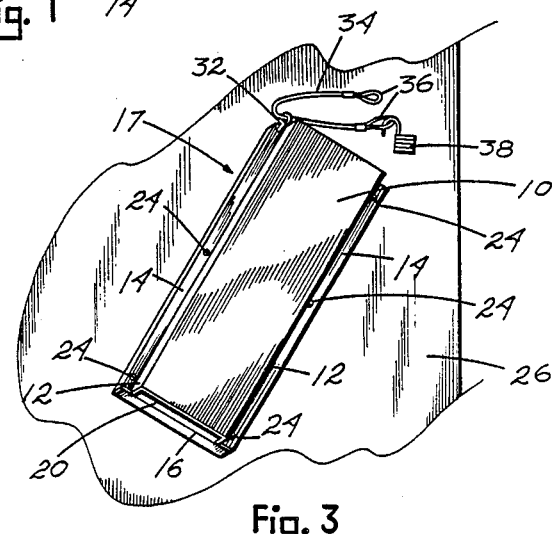
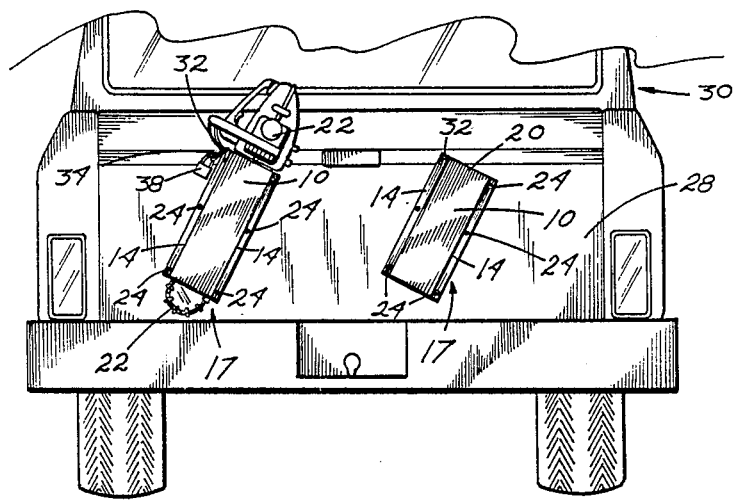

LOCKABLE MOUNTING BRACKET FOR CHAIN SAWS

BACKGROUND OF THE INVENTION

1. Field of the Invention

This invention relates to mounting brackets for chain saws in general and more specifically to a lockable bracket attachable to the tailgate of a pickup truck with the mounting bracket designed especially for the safe storage and transportation of the chain saw.

2. Description of the Prior Art

A search was conducted to produce past art patents similar to my invention. To the best of my knowledge, only the following device was found to be relevant:

The patent issued to Harper on Sept. 25, 1984, U.S. Pat. No. 4,473,176, discloses a security mounting device for a chain saw which is best structured for attachment to a horizontal surface. Although this past art device provides for securing the chain saw against theft, the site of attachment for the mounting device, as suggested in the specification, is either to the flat surface of the bed of a pickup or the floor of the cab. Not only is valuable space occupied in the cab or truck bed, but the naturally soiled condition of the chain saw, caused by oil and gas leaks, makes it an inconvenience to transport the chain saw in the cab of the truck. Also, space is not always readily available for attaching a bracket for chain saw storage in the truck bed. This is especially true when the truck bed is needed for aggregates and often wood. In many cases, the chain saw inserted in the mounting bracket would be difficult to retrieve until the cargo was removed. The Harper patent also does not provide any means for protecting the guide bar and chain from damage if the cargo shifts. If the Harper device were attached to the tailgate of a pickup truck, the guide bar would not only be unprotected but it would also pose a potential hazard to people.

As my chain saw bracket can be mounted in various out-of-way places and both covers the guide bar and secures the chain saw locked with the cutting chain covered, I feel my device provides new and useful benefits for chain saw mounting brackets which are not disclosed or anticipated in the Harper patent and in other past-art patents.

SUMMARY OF THE INVENTION

In practicing my invention, I have developed a lockable bracket for chain saws especially suited for mounting on the outside to the tailgate of a pickup truck. My chain saw bracket comprises a substantially rectangular metal or plastic panel having two narrow sides curvedly right angled to form a flattened U-shaped housing. Both ends of the housing are normally open but for some applications, one end to be positioned downwardly can have an end closure. Longitudinally, the opened U edges of the flattened U-shaped housing are sharply right angled outwardly into narrow mounting flanges attached to a rectangular base. The rectangular base has the same width and length as the two attached flanges and the top panel. The base acts as a second wall allowing protective insertion of a chain saw blade inside the flattened U structure between the panel and the base. The edges of the base where the flanges are attached serve as the surfaces for mounting the chain saw bracket to a supporting structure. Attachment apertures for mounting by bolts or screws align the exposed surface of the flanges and pass through the base. For best results, my chain saw bracket should be mounted with the uppermost opening angled right of the bottom opening approximately 60 to 45 degrees. The mounting angle is not necessarily critical being dependent upon space available and the owner's preference. Although the device is directed for mounting on the outside of a pickup truck tailgate, the present invention is sufficiently versatile to be mounted on any support surface including a wall for display purposes. When mounted, the inside surface of the panel and of the base create a narrow passageway between the top panel and the base to provide a housing for the chain and guide bar of the chain saw. One eye bolt is provided with the device and is designed to be mounted in the upper corner aperture, serving both as a securing means and a lock retainer. A padlock, along with a short cable assembly having looped ends, is provided with the bracket and serves as the lockable securing means. For its basic purpose, the mounting bracket is attached outside to the tailgate of a pickup truck at an approximate forty-five degree angle with the eye bolt positioned in the uppermost corner. The guide bar of the chain saw is inserted into the interior housing of the device and the cable assembly is attached tightly around the handle then secured by the padlock. Locked in, the chain saw is prevented from falling out during transportation or when the tailgate is lowered.

Therefore, it is a primary object of my invention to provide a chain saw mounting bracket which safely secures the chain saw to a vehicle during transporting.

A further object of my invention is to provide a chain saw mounting bracket which is lockable to prevent theft.

Another object of my invention is to provide a chain saw mounting bracket especially suited for mounting to the tailgate of a pickup truck but which can also be mounted to other vertical and horizontal surfaces. An even further object of my invention is to provide a chain saw mounting bracket which is simple and cost effective to manufacture.

Many other objects and advantages will become apparent from a reading of the following specification and comparison of the numbered parts described with similarly numbered parts illustrated in the accompanying drawings.

BRIEF DESCRIPTION OF THE DRAWINGS

FIG. 1 is a top plan view of the chain saw bracket.

FIG. 2 is an end view of FIG. 1.

FIG. 3 is a perspective view illustrating the device mounted to a vertical wall. The cable assembly and padlock are also illustrated.

FIG. 4 is an in use illustration of two brackets attached outside to the tailgate of a pickup truck with the one positioned left in the drawing housing a conventional chain saw, and the one positioned right empty.

DRAWING REFERENCE NUMBERS

10 housing panel
12 side panel
14 flanges
16 base
17 mounting bracket
18 attachment apertures
20 U-shaped guide bar housing
22 chain saw
24 bolts 26 wall
28 tailgate
30 pickup truck
32 eye bolt
34 cable
36 loops
38 padlock

DESCRIPTION OF THE PREFERRED EMBODIMENT

Referring now to the drawings and to FIG. 1 where the preferred embodiment of the invention is illustrated in a frontal view. The front surface of the preferred embodiment is comprised of housing panel 10 which is a substantially rectangular elongated panel having two downwardly positioned side panels 12. Housing panel 10 has, aside from a front surface, a top and bottom edge, an interior surface and two side edges to which side panels 12 are perpendicularly attached, shown in FIGS. 2 and 3. Projecting outward at a right angle from the lower bottom edge of side panels 12 are flanges 14, shown in all Figures. Flanges 14 serve as the attachment surface of housing panel 10 onto base 16. Base plate 16 is a substantially rectangular elongated plate having the same length and width as combined housing panel 10 and flanges 14. Base 16 also has a front and back surface, a top and bottom edge, and two lengthwise sides. The thickness of base 16 is significant in that it must be of sufficient height to provide enough room for the right side of the housing of chain saw 22 which extends past the guide bar when that guide bar is inserted into U-shaped guide bar housing 20. The width of the right side of chain saw 22 varies slightly from model to model but an approximate thickness of three-fourths of an inch is provided for base 16 which is sufficient for most models. Base 16 can also be provided in thicker measurements to accommodate older and wider models of chain saws 22.

The attachment of housing panel 10 and base 16 collectively form mounting bracket 17. The attachment of flanges 14 onto the top surface of base 16 is accomplished through adhesive means, but other attachment methods such as bolts, screws or welding can be used if the assembled housing panel 10 and base 16 are manufactured of materials including wood, plastics or metals, or a combination of the three. Mounting bracket 17 can also be molded in one piece when manufactured of plastic or fiberglass. A protective coating of plastic or other material is recommended for base 16 if manufactured of wood to protect it from the weather. U-shaped guide bar housing 20 is an interior chamber which is created by housing panel 10, side panels 12, and base 16, and is sized for receiving the guide bar and chain of chain saw 22. The front surface of each flange 14 contains at least three attachment apertures 18 which continue down through base 16. Attachment apertures 18, along with bolts 24, serve as the attachment means of mounting bracket 17 onto wall 26 or tailgate 28 of pickup truck 30. Attachment of mounting bracket 17 is made at a forty-five degree angle onto the surface of wall 26 or tailgate 28 so that the guide bar of chain saw 22 can be retained within U-shaped guide bar housing 20 with the aid of gravity. Eye bolt 32 is substituted for one bolt 24 and is positioned in the uppermost corner of mounting bracket 17, serving both as a means of attachment for base 16 as well as a portion of the securing means. Eye bolt 32 and cable 34, which contains loops 36 on each end, are used in conjunction along with padlock 38 to secure chain saw 22 within the bracket. One loop 36 is passed through the eye of eye bolt 32 and then passed through the handle located on chain saw 22. The shackle portion of padlock 38 is then passed through both loops 36 and locked securing chain saw 22 from theft or loss. This securing means is most effective when there is a tight connection between chain saw 22 and eye bolt 32 which prevents excessive movement of the guide bar of chain saw 22 within U-shaped guide bar housing 20. It also prevents chain saw 22 from becoming partially dislodged from mounting bracket 17 when tailgate 28 is lowered.

Although I have described my invention in detail in the specification it is to be understood that modifications and changes may be practiced in the structure and design of my device which do not exceed the intended scope of the appended claims.

What I claim as my invention is:

1. A lockable chain saw mounting bracket, comprising:
   a. a chain and guide bar housing;
   said housing being a substantially rectangular panel having two narrow sides curvedly right angled to form a flattened U-shaped open ended structure with the opened edges of the U sharply right angled outwardly into two narrow mounting flanges;
   b. a substantially rectangular base;
   said rectangular base having the same width as the sum of the widths of said panel and said two mounting flanges with the length of said base corresponding to the length of said panel, said panel affixed to a surface of said base by said mounting flanges longitudinally aligned therewith producing a flattened U-shaped passageway sized for insertion of a chain saw chain and guide bar inside between opposing surfaces of said panel and said base, said base being sufficiently thickened to adequately support said chain saw in an angular mounted position;
   c. means for attaching said flanges to said base;
   d. means for attaching said bracket to a vehicle
   e. means for locking said chain saw; said chain saw being retained by said means for locking with said chain and guide bar inserted inside said flattened U-structure.

2. The lockable chain saw mounting bracket of claim 1 wherein said panel is manufactured of suitable materials with said suitable materials including metal, plastic, fiberglass, and combinations thereof.

3. The lockable chain saw mounting bracket of claim 1 wherein said base is manufactured of suitable materials with said suitable materials including wood, plastic, metal, and combinations thereof.

4. The lockable chain saw mounting bracket of claim 1 wherein said means for attaching said flanges to said base includes adhesives, screwing, bolting, welding, and inherent plastic molding.

5. The lockable chain saw mounting bracket of claim 1 wherein said means for attaching said bracket to said vehicle being said bracket having attachment apertures through said flanges and said base along said flange alignment with said base, said apertures sized for secure attachment of said bracket to said vehicle by nuts and bolt, screws, and combinations thereof.

* * * * *